United States Patent [19]

Lawton

[11] Patent Number: 5,980,812
[45] Date of Patent: Nov. 9, 1999

[54] SOLID IMAGING PROCESS USING COMPONENT HOMOGENIZATION

[76] Inventor: John A. Lawton, 255 N. Creek Rd., Landenburg, Pa. 19350

[21] Appl. No.: 08/846,271

[22] Filed: Apr. 30, 1997

[51] Int. Cl.$^6$ .............................. B29C 35/08; B29C 41/02
[52] U.S. Cl. ......................... 264/401; 264/308; 264/497; 419/46
[58] Field of Search .................................. 264/308, 401, 264/497; 419/46

[56] References Cited

U.S. PATENT DOCUMENTS

| | | |
|---|---|---|
| 3,951,651 | 4/1976 | Mehrabian et al. . |
| 4,007,770 | 2/1977 | Timmons . |
| 4,117,302 | 9/1978 | Earle et al. . |
| 4,182,299 | 1/1980 | Earle et al. . |
| 4,243,867 | 1/1981 | Earle et al. . |

(List continued on next page.)

OTHER PUBLICATIONS

Mamoru Okutomi, The Synthesis of Ceramics by Lasers (English translation), in *Kino Zairvo 7*, No. 8, pp. 1–27 (Nov. 24, 1987).

M.K. Agarwala, D.L. Bourell, J.J. Beaman, B. Wu, H.L. Marcus, Structurally sound metal parts by selective laser sintering, in *EPD Cong. 1994, Proc. Symp. TMS Annu. Meet*, G.W. Warren, Ed., Miner, Met. Mater. Soc., War in an imagewise manner rendale, Pa. (122:166949), Abstract No. 14549 (1994).

E. M. Breinan, D.B. Snow, C.O. Brown and B.H. Kear, New Developments in Laser Surface Melting Using Continuous Prealloyed Powder Feed, prepared for United technologies Research Center, East Hartford, CT 06108, in *Rapid Solidif. Process.: Prin. Technol. Proc. Int. Conf., 2nd*, pp. 440–452 (1980).

Hansen, "Constitution of Binary Alloys," McGraw–Hill, pp. 317–318 (1958).

*Identification of Major Developments in Polymer Blend/ Alloys Models for Predicting Polymer/Polymer Miscibility*, vol. III, Battelle Columbus Edition (undated).

Layer Deposition in SLA and SLS, *Prototyping Technology International '97*, pp. 139–144 (1997).

J. W. Barlow and D. R. Paul, Polymer Blends and Alloys—A Review of Selected Considerations, in *Polymer Engineering and Science*, vol. 21, No. 15, pp. 985–996 (Oct., 1981).

*CRC Handbook of Chemistry and Physics*, 65$^{th}$ Edition, Section F–66 Definitions (1984–85).

*Funk and Wagnalls New Encyclopedia*, Infopedia 2.0 CD–ROM, "Photochemistry" (1996).

J.R. Fessler, R. Merz, A.H. Nickel, F.B. Prinz, and L.E. Weiss, Laser Deposition of Metals for Shape Deposition Manufacturing, *Solid Freeform Fabrication Symposium*, pp. 117–124. (Aug. 12–14, 1996).

Steven Ashley, From CAD Art to Rapid Metal Tools, *Mechanical Engineering*, vol. 119, No. 3, pp. 82–87. (Mar., 1997) (printed off the Internet—pp. 1–9).

B.R. Birmingham and H.L. Marcus, Solid Freeform Fabrication of Silicon Garbide Shapes by Selective Laser Reaction Sintering (SLRS), *Solid Freeform Fabrication Symposium*, pp. 308–316. (Aug. 9–11, 1993).

V.R. Davé, J.E. Matz, T.W. Eagar, Electron Beam Solid Freeform Fabrication of Metal Parts, *Solid Freeform Fabrication Symposium*, pp. 64–71. (Aug. 7–9, 1995).

M.A. House, E.J. Whitney, D.G. Krantz, and F.G. Arcella, Rapid Laser Forming of Titanium Near Shape Articles: Laser Cast™, *solid Freeform Fabrication Symposium*, pp. 239–248. (aug. 12–14, 1996).

*Primary Examiner*—Leo B. Tentoni
*Attorney, Agent, or Firm*—Connolly & Hutz

[57] ABSTRACT

Solid objects are formed in an imagewise layering process in which components of a dispersion are homogenized to form an alloy. Imagewise exposure of the layers to radiation to form an alloy permits separation of the exposed, homogenized regions from non-exposed, non-homogenized regions. As each layer is formed and imagewise homogenized, contiguous layer regions are bonded together to form a homogenized, three-dimensional object which may be separated from surrounding dispersion.

21 Claims, 5 Drawing Sheets

U.S. PATENT DOCUMENTS

| | | |
|---|---|---|
| 4,269,868 | 5/1981 | Livsey . |
| 4,283,475 | 8/1981 | Kawamura et al. ............... 430/70 |
| 4,300,474 | 11/1981 | Livsey . |
| 4,323,756 | 4/1982 | Brown et al. . |
| 4,330,699 | 5/1982 | Farrow ............... 219/121.64 |
| 4,474,861 | 10/1984 | Ecer . |
| 4,508,811 | 4/1985 | Gravesteijn et al. ............ 430/270.18 |
| 4,575,330 | 3/1986 | Hull ............... 264/401 X |
| 4,752,352 | 6/1988 | Feygin . |
| 4,938,816 | 7/1990 | Beaman et al. ............... 264/497 X |
| 5,006,364 | 4/1991 | Fan . |
| 5,014,207 | 5/1991 | Lawton ............... 364/468.27 |
| 5,017,317 | 5/1991 | Marcus . |
| 5,098,469 | 3/1992 | Rezhets . |
| 5,143,817 | 9/1992 | Lawton et al. ............... 264/401 X |
| 5,193,024 | 3/1993 | Lawton et al. ............... 359/253 |
| 5,260,009 | 11/1993 | Penn ............... 264/401 |
| 5,354,414 | 10/1994 | Feygin ............... 264/497 X |
| 5,474,719 | 12/1995 | Fan et al. ............... 264/401 |

SOLID IMAGING PROCESS USING COMPONENT HOMOGENIZATION

FIELD OF THE INVENTION

The invention relates to a process of making models, molds, near net shape parts, and other integral objects using an imagewise exposure of a dispersion of components to radiation. The process is based on homogenizing the components of the dispersion to form an alloy which have properties different from the properties of the dispersion or its individual components.

BACKGROUND AND PRIOR ART

Layer-by-layer solid imaging techniques, including stereolithography and selective laser sintering, have been used to produce models, mold patterns, and near net shape production parts. Stereolithography provides high accuracy and excellent surface finish, but does not normally allow for production of objects in engineering materials such as nylon or ABS. Selective laser sintering can produce objects in nylon or polycarbonate but cannot produce objects of full density, and generally produces objects having low surface quality.

U.S. Pat. No. 5,354,414 describes imagewise formation of an integral object which can be separated from the non-imaged regions. Processes of brazing, soldering and welding are disclosed for producing the integral object.

U.S. Pat. No. 4,575,330 describes generation of three-dimensional objects by creating a cross-sectional pattern of the object on the surface of a fluid medium. The physical state of the medium is altered to form successive cross-sectional layers and provide a step-wise laminar buildup of the desired object. As an example of a suitable change in physical state, the patent discloses free-radical curing of acrylate.

U.S. Pat. No. 5,474,719 describes a solid imaging process wherein high viscosity liquids are viscosity-reduced during coating and allowed to increase in viscosity during imaging steps. In particular, the compositions contain a photohardenable monomer and a photoinitiator, and the photohardening methods suggested involved free-radical polymerization, cationic polymerization, anionic polymerization, condensation polymerization, addition polymerization, and the like.

U.S. Pat. No. 4,938,816 describes a process for selectively sintering a layer of powder to produce a part comprising a plurality of sintered layers. The bulk density of the powder is increased prior to sintering or melting the powder by exposure. Attaining high bulk density of powders for sintering is difficult, however, and requires the use of substantial pressures.

It is known in the art that certain advantages are associated with providing at least one above solidus temperature component in a dispersion to be sintered. The advantages are, for example, improved wetting between the components, reduction of friction between the components to allow for greater densification, capillary forces which draw the components together and drive densification, and greater molecular diffusion between components during sintering. See, for example, R. M. German, Liquid Phase Sintering, Plenum Press, New York, 1985; and Eremenko et al, Liquid Phase Sintering, Plenum Publishing Corp., New York, 1970. These disclosures do not teach imagewise layer-by-layer formation of three-dimensional integral articles.

SUMMARY OF THE INVENTION

The invention comprises a process for producing three-dimensional integral objects by imagewise radiation of a dispersion of components A and B, comprising the steps of:

a) providing a dispersion of component A and component B;

b) forming the dispersion into a layer;

c) homogenizing the dispersion by the application of imagewise radiation to form an alloy of components A and B; and d) repeating steps a)–c) by applying each successive layer of dispersion onto the previous layer, such that each new homogenized region becomes integral with the previous homogenized region to form a homogenized, integral, three-dimensional object.

Components A and B may be polymers, metals, ceramics, or combinations of these materials. The components A and B are capable of alloying, when exposed to imagewise radiation, to form an alloy of the two components A and B which is characterized by physical and/or chemical properties which are distinct from the physical and/or chemical properties of the dispersion of components A and B. The components are combined into intimate contact to form the dispersion, preferably with one component being in a liquid state or above solidus state, prior to homogenization. Following homogenization by imagewise exposure, the homogenized alloy article may be separated from the unexposed dispersion based on the difference in physical and/or chemical properties. For example, the homogenized alloy of components A and B may have a melting point different from the melting point of component A, the melting point of component B, or the melting point of an intimate dispersion of components A and B.

DESCRIPTION OF PREFERRED EMBODIMENTS

Figure 1:
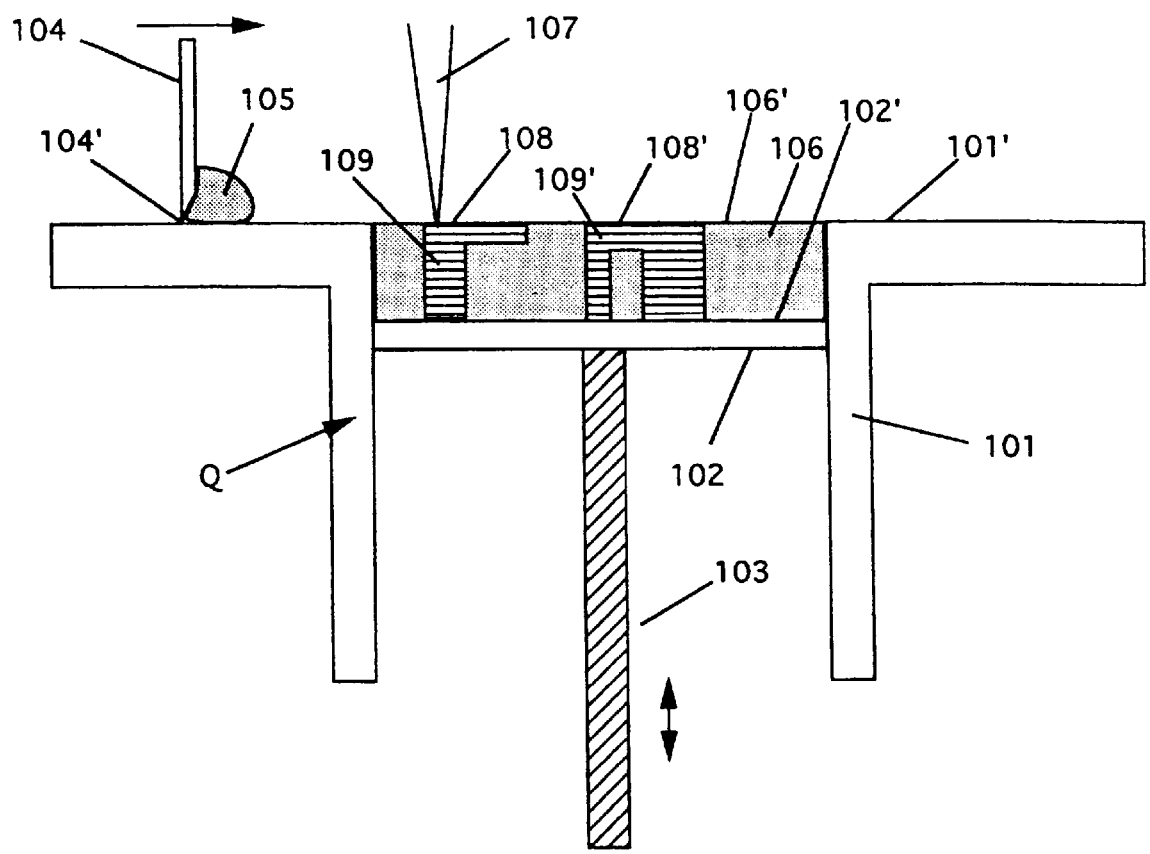
FIG. 1 is sectional view of equipment suitable for carrying out the process of the invention

The term "homogenized" or "homogenization", for the purposes of this disclosure, will refer to the formation of an alloy between the substances which are homogenized. This requires sufficient molecular or elemental mixing between the components to result in properties, either physical or chemical or both, which are different from the properties of the individual components in intimate contact in the form of a dispersion. The difference in properties of the alloy is preferably sufficient in itself to permit separation of the alloyed components from non-alloyed, surrounding regions of the dispersed components following imagewise exposure. In a particularly preferred embodiment, the alloyed (homogenized) material has a different melting point than the dispersion of components A and B, and thus, the alloyed three-dimensional article can be separated from the surrounding dispersion based on the difference in melting point.

Components which can be alloyed from a dispersion of components in the manner described, and which may be used as component A and component B in the practice of the invention, include polymers, metals, and ceramics. In some instances, nonmetal elements may be alloyed with metals. Preferred alloys formed by homogenization include polymer/polymer alloys, metal/metal alloys, ceramic/ceramic alloys, polymer/metal alloys, and metal/ceramic alloys. Choice of the particular material combination to be used depends on the nature and intended use of the three-dimensional part or object being produced. From within these classes of materials, the components A and B should be selected so as to be: capable of alloying under the exposure of imagewise radiation within a practical range of intensity; the alloy must have physical and/or chemical properties distinct from the properties of an intimate dispersion of A in B or B in A; and the alloy of A and B should preferably be separable from unalloyed dispersion of A and B based on the difference in physical and/or chemical properties.

The components may consist of polymers, which can be dispersed together and alloyed by the application of radiation. In a preferred embodiment, a first particulate polymer (A) is dispersed in a second, liquid polymer (B) to form an intimate dispersion. Application of imaging radiation causes the particulate polymer to assume a different form in the liquid polymer, which changes the conformation of the particulate to allow for more intimate interaction between the first polymer and the liquid polymer. This interaction of the two polymers forms a polymer alloy having properties (for example melting point) different from polymer A, polymer B, and the intimate dispersion of polymer A in polymer B. The homogenization to form an alloy between polymers is a non-polymerization interaction, and polymerization techniques (free radical, condensation, and like mechanisms between monomers and/or oligomers and optionally initiators) are excluded from the definition of "homogenization" as used herein. The interaction between polymers upon imagewise exposure to radiation is primarily noncovalent, involving hydrogen bonding, n-pi complexing, pi-pi complexing, or dipole interactions, although incidental grafting, cross-linking or the like which may occur between the polymers is not excluded.

The components may consist of metals or ceramics which, when contacted with appropriate imaging radiation of appropriate intensity, form a metal or ceramic alloy having properties distinguishable from the properties of the components. For example, powdered bismuth and powdered magnesium can be combined, in the ratios of about 30 atomic percent bismuth to about 70 atomic percent magnesium, as an intimate powder dispersion. Although the components are in intimate contact, the bismuth powder and the magnesium powder retain their characteristic, individual properties. Even if the bismuth powder (melting point 268.5° C.) is melted sufficiently to wet the magnesium powder (melting point 650° C.) and thus increase the intimate contact between the components, each component in the dispersion still retains its essential and unique properties. However, if the magnesium powder is also melted and mixing results between the melted bismuth and magnesium, then either the intermetallic compound $Mg_3Bi_2$ (melting point 823° C.) is formed, or upon more intense radiation, a higher melting point alloy is formed. It will thus be understood that homogenization, in the case of metals and ceramics, is different from conventional sintering techniques, wherein powders are heated to essentially fuse or bond the particulates at their outermost points of contact into a solid mass. This also distinguishes the homogenization process of the invention from selective laser sintering (SLS) techniques. Thus, it will be understood that "homogenization" for purposes of the invention requires intimate mixing of at least two components with resultant formation of an alloy between the components, which cannot be achieved using conventional sintering techniques. Moreover, in the case of sintering, the sintered object cannot be separated from a surrounding powder bed based on melting temperature, whereas convenience of separation is an advantage associated with certain embodiments of the present invention.

Techniques similar to sintering are "brazing", welding and soldering. Brazing is a metal joining process wherein a nonferrous filler metal wets a base metal when molten in a manner similar to a solder and its base metal. There is a slight diffusion of the filler metal into the hot, solid base metal, or a surface alloying of the base and filler metals. A surface bond is formed between materials that does not cause changes in physical properties in the individual components except at the surface. Brazing, welding and soldering are also different from homogenization as described herein.

It should be noted that homogenization does not require complete mixing. It is recognized, for example, that solidified alloys may contain crystals or phases of varying composition. In the context of the present invention, homogenization progresses to the extent that the homogenized regions forming the three-dimensional integral object have different properties, and normally can be separated from the non-homogenized surrounding regions based on those different properties.

Suitable polymer materials for components A and B are disclosed generally in the following disclosures, which are incorporated herein by reference. Polymer alloys are disclosed in Batelle, "Report on Major Developments in Polymer Blends", Vols. 1–3, Columbus Division, Columbus, Ohio, (1986); and Barlow et al., Polymer Blends and Alloys, A Review of Selected Considerations, Polymer Engineering and Science, 21: 985 (1981). Polymers used as component A or B may comprise pure polymer or may comprise polymers and related monomers and solvents. In the polymer alloys (sometimes called polymer blends) the repeating functional units of one polymer interact with the repeating units of the other polymer(s) in a manner which renders the polymers miscible and makes the alloy thermodynamically stable upon imaging. As noted, such interactions are primarily noncovalent. The polymer alloys have different properties than the individual polymers or the polymers in dispersion, such properties including, for example, melting temperature, glass transition temperature, heat distortion temperature, and the like. Exemplary of polymer pairs suitable for components A and B of the invention are the following: polycaprolactone/poly(vinylchloride); polycaprolactone/Saran; polycaprolactone/bisphenol A polycarbonate; poly(vinyl methyl ether)/phenoxy; poly(ethylene oxide)/phenoxy; poly(ethylene oxide)/poly(acrylic acid); BPA polycarbonate/PHFA; polystyrene/polyphenylene oxide.

Metallic alloys are disclosed in, for example, Hansen, "Constitution of Binary Alloys", McGraw-Hill (1958); and A.S.M. Metals Reference Book, ASM International, Materials Park, Ohio (1993).

Preferred ceramic/ceramic and ceramic/metal alloys are disclosed in "Phase Diagrams for Ceramicists", Vols. 1–8, The American Ceramic Society, Columbus, Ohio.

Material pairs selected from within the materials disclosed in these references should be selected to achieve the criteria described above, primarily, alloy formation upon imagewise exposure to radiation.

Figure 2:
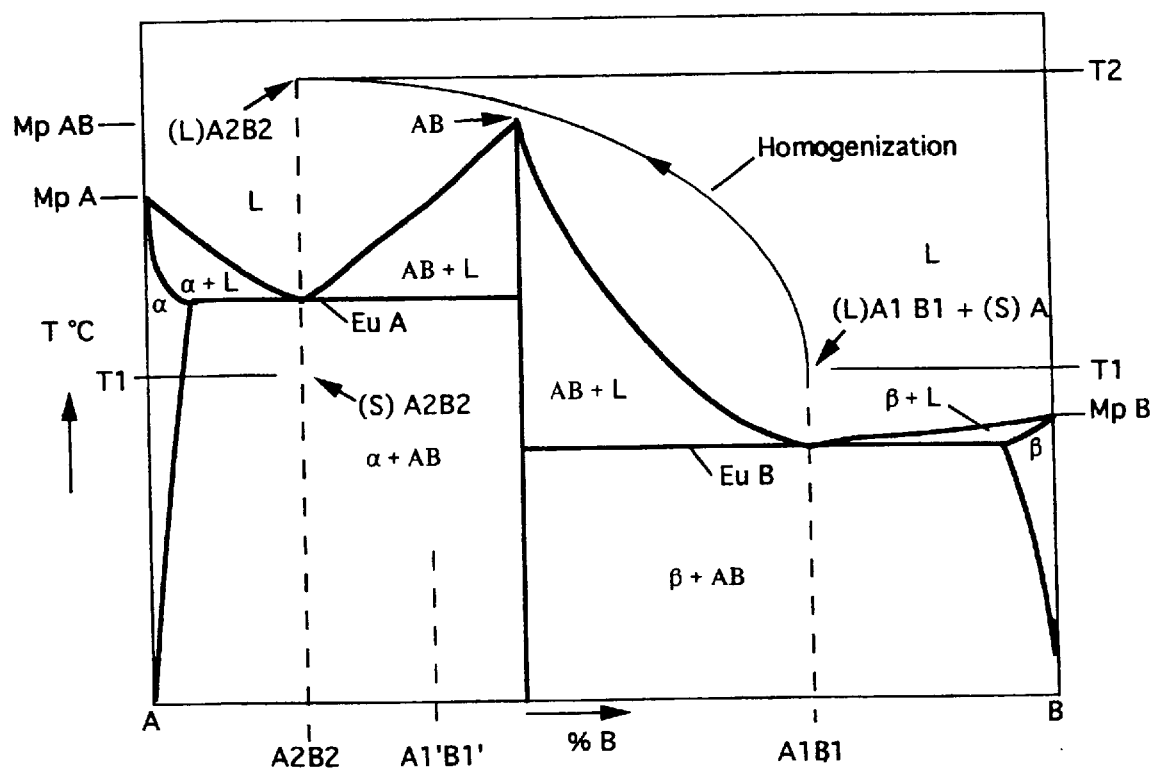
FIG. 2 is a phase diagram illustrating homogenization of two components into an alloy.

In a currently preferred embodiment of the invention, the components A and B exhibit properties in accordance with the phase diagram shown in FIG. 2. FIG. 2 illustrates certain preferred principles to be considered, but should not be understood as limiting the possible phase relationships between components. FIG. 2 shows, by means of a phase diagram the characteristics of a binary alloy of component A and component B having properties particularly contemplated for use in this invention. The X-axis starts with 100% of component A at the left and increasing amounts of component B moving toward the right. The Y-axis shows increasing temperatures. Component A tends to crystallize in crystalline structure a especially when in pure form. Component B tends to crystallize in crystalline structure β especially when in pure form. Components A and B preferably form an intercomponent compound AB at a certain relative percentage of component A and component B. Intercomponent compounds AB may have different component ratios than the stochiometric ratios which are required with other chemical reactions and with other chemical compounds. In addition, the type of bonding for chemical compounds may be different from that of alloy crystals and intercomponent compounds. The intercomponent compound AB provides a thermodynamic barrier which allows a distinct separation based on melting point. Intercomponent compounds AB are not necessarily line compounds, as shown, but may exist over a broader composition range of component A and component B. The melting point of component A is shown as MpA, the melting point of component B is shown as MpB, and the melting point of intercomponent compound AB is shown as MpAB. Above the various melting points is a region shown as L (liquid) and may be interpreted as a liquid mixture of components A and B. At lower percentages of component B and at temperatures below a eutectic isotherm line EuA, components A and B form a crystalline alloy comprised of α and intercomponent crystal AB. At higher percentages of component B and at temperatures below a eutectic isotherm line EuB, components A and B form a crystalline alloy comprised of β and intercomponent crystal AB. At temperatures above these eutectic isothermal lines EuA and EuB or above the a and β solidus curves, the mixture of components forms either a liquid L or a dispersion of one of the solid crystalline components α,β, or AB and liquid L. In other words, above these eutectic isothermal lines Eu A and Eu B or solidus curves, melting begins to occur. As seen in FIG. 2, the melting point of intercomponent compound AB, MpAB is the highest, followed by MpA, then EuA, then MpB, with the melting point of EuB being the lowest.

Phase diagrams such as FIG. 2 represent the state of component mixtures under equilibrium conditions where the components are mixed on a molecular or atomic level in the liquid state and are allowed to cool slowly such that the crystalline structure and composition occur as depicted (or where solid state diffusion exists and sufficient time is allowed such that an equilibrium is reached). If cooling is fast, different crystalline structures or compositions may exist. If solid powders of component A are introduced into a liquid bath of component B at a temperature above MpB but below MpA, a dispersion of powdered A in liquid B may result rather than a molecular or atomic mix of components A and B. This is more likely when the solubility of liquid component B is low in solid component A since, under such temperature conditions, homogenization may not occur or may occur slowly. Homogenization may also be somewhat inhibited if liquid component B does not easily wet solid component A. However, it is preferred that good wetting exist between components A and B.

Figure 5:
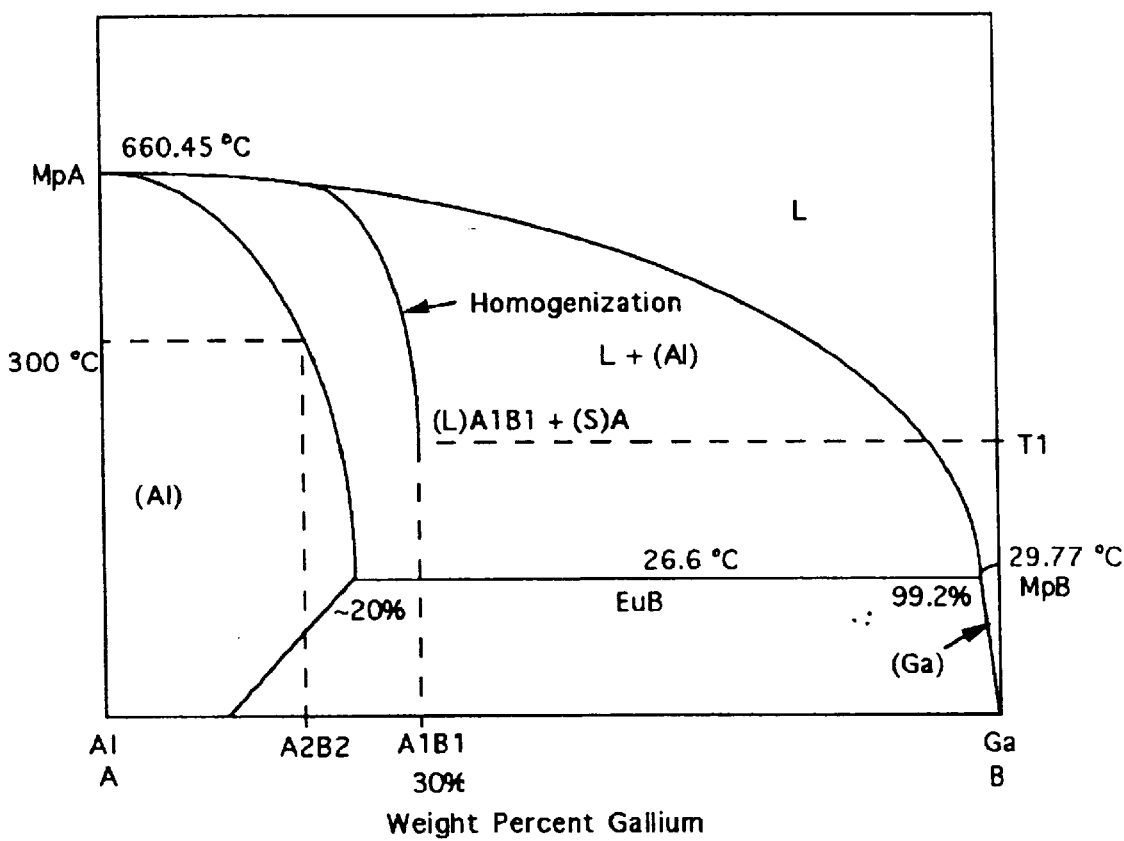
FIG. 5 is a phase diagram illustrating the phase relationship of gallium and aluminum.

With reference to FIG. 5, as another example, aluminum and gallium form a eutectic EuB with a melting point of roughly 26.6° C. for weight percent compositions of approximately 20 to 92.2% gallium. However, there is a remarkable increase in melting point along the (Al) crystalline solidus line for alloys comprising less than approximately 20 weight % gallium. In this example, if a dispersion comprising an alloy A1B1 of slightly more than 20 weight % gallium with aluminum as the liquid phase component B and a powdered component A of aluminum is provided and coated into a layer, then a homogenized alloy region A2B2 of the dispersion would have a significantly higher melting point. For example, consider the following dispersion A1B1+(S)A:

50 parts of component B (Alloy A1B1 containing 30% gallium and 70% aluminum)

50 parts of solid component A (powdered aluminum)

The dispersion A1B1+(S)A would begin to form a liquid phase if heated to above 26.2° C. The amount of liquid can be calculated based upon tie-line calculations well known in the art. Above this temperature, the dispersion(L)A1B1+(S)A could be coated into a layer. Next, the layer could be imagewise homogenized forming an alloy region A2B2 having a composition of 85% aluminum and 15% gallium. This region A2B2 (assuming complete homogenization of the aluminum and gallium) would have a melting point of over 300° C. The difference between the homogenized alloy A2B2 melting point and the melting point EuB of the dispersion (L)A1B1+(S)A would allow separation of the homogenized region A2B2 from surrounding dispersion(L) A1B1+(S)A.

In forming objects using alloys of aluminum and gallium, those skilled in the art would recognize that the liquids curve extends up to 99.2% by weight of gallium. This reduces the amount of liquid formed (based upon tie-line estimates) in the liquid component (L)A1B1+(S)A so that higher temperatures T1 should be used during coating. Alternatively, coating pressures, such as the use of a heated roller, could be used to aid the formation of the dispersion (L)A1B1+(S)A into a layer.

Apparatus for carrying out imagewise formation of three dimensional parts are known in the art, and are described, for example, in U.S. Pat. Nos. 5,354,414; 5,474,719; 4,575,330; 4,938,816; and 5,014,207. Preferred apparatus is described below in connection with drawing FIG. 1.

The system illustrated in FIG. 1 utilizes focused radiation adapted to be scanned imagewise by means of, for example, an X-Y mirror scanning apparatus. As shown in FIG. 1, a cylinder 101 and coating platform surface 101' are positioned such that the platform surface 101' is generally normal to and in the focal region of beam 107. Within the cylinder 101 is piston 102, which is adapted to move up and down relative to the platform surface 101'. The piston 102 is driven by a motorized screw drive 103. A doctor blade 104 is adapted such that the doctor blade edge 104' is slidably in close proximity with the platform surface 101' and traverses the platform surface 101' and the piston surface 102' or above the piston surface 102', should the piston 102 be lower than the platform surface 101'. The doctor blade 104 is driven by a motor drive/linear bearing mechanism not shown. A portion of dispersion of components A and B 105 is placed on the platform surface 101 in advance of the motion of the doctor blade 104 such that the blade edge 104' can spread the dispersion 105 across the platform surface 101' and across the piston surface 102'. Enough dispersion 105 is placed forward of the motion of the doctor blade 104 to fill in a cavity made within the cylinder 101 between the platform surface 101' and the surface of the piston 102'. Initially the piston 102 is positioned within the cylinder 101 such that the piston surface 102' is approximately one layer thickness below the surface of the platform 101'. Doctor blade 104 traverses across the platform surface 101' and spreads the dispersion 105 into the cavity made by the piston 102 and the cylinder 101. The coated dispersion 106 within the cavity is exposed imagewise by beam 107 in part regions 108 and 108', the part regions being shown as having different shapes. In the exposed regions 108 and 108', the coated dispersion 106 is heated by the focused beam 107 such that the components A and B are homogenized and form alloy regions 108 and 108' which are hardened and can be separated from the surrounding liquid dispersion 106. Normally, the first formed regions 108 and 108' are adhered to the piston surface 102'. Next, piston 102 is moved down another one layer thickness forming a cavity between the dispersion surface 106', the part surface 108 and 108', and the platform surface 101'. More dispersion 105 is placed in advance of the motion of the doctor blade 104. The dispersion 105 is spread into the cavity forming a new coated dispersion surface 106'. Then this dispersion surface 106' is exposed imagewise with beam 107 forming new homogenized part surfaces 108 and 108'. Adequate exposure is provided by beam 107 to ensure adhesion between the new part surfaces 108 and 108' and the previously homogenized part surfaces exposed after the first coating step. This adhesion is assured by providing enough energy through beam 107 to make the new layers 108 and 108' thicker than the coated layer 106'. The adhered layers form integral parts 109 and 109'. By repeating the process of creating a cavity, forming a new coated surface 106' and exposing the surface 106' in image regions 108 and 108' with the beam 107, multilayer homogenized integral parts 109 and 109' are formed. Although in general heat Q is provided simply by ambient air surrounding the apparatus of FIG. 1, it may be necessary in some cases to pre-heat the surface of piston 102' prior to coating the first layer to assure adhesion between the first image region 108 and 108' and the piston surface 102'. This preheating Q can be accomplished with a hot air gun, or can be applied to any portion of the apparatus of FIG. 1 by any heating method, for example resistance wires, ambient air, or exposure beam 107.

The parts 109 and 109' as shown are cantilevered sections and other unsupported sections as depicted in FIG. 1. The parts formed may be solid parts, or may be partially hollow. There are no size limitations on the parts which can be formed other than the capacity of the equipment and the fineness of the dispersion 106.

A further preferred means of carrying out the invention is described with reference to both FIG. 1 and FIG. 2. A dispersion 105 is supplied before doctor blade 104. The dispersion 105 comprises a dispersion of liquid alloy A1B1 which has a composition coincident with eutectic isothermal EuB at the eutectic point and also comprises a solid component of pure A (see FIG. 2). In this example, the composition of the dispersion 105 is such that, if completely homogenized by beam 107, the dispersion 105 would form an alloy region 108 having a composition A2B2, which is shown in FIG. 2 as a composition coincident with the eutectic point on the eutectic isothermal line EuA. Heat Q is supplied to the apparatus such that the temperature of the apparatus in FIG. 1 is at T1 in FIG. 2. The dispersion 105 is also at temperature T1 as shown in FIG. 2 during spreading by doctor blade 104 over the platform surface 101' and piston surface 102', or over the previous coated dispersion 106 or homogenized objects 109 and 109'. Therefore dispersion 105 has a liquid phase component (L)A1B1 and a solid phase component (S)A at temperature T1 as shown in FIG. 2. Prior to coating the dispersion 105, the piston 102 is moved down in the cylinder 101 a distance such that a cavity exists above the piston surface 102' and below the platform surface 101'. The distance is the depth of one layer of the object 109 and 109' to be formed. After coating of dispersion 105 with doctor blade 104, a layer of coated dispersion 106 fills this cavity. A focused beam 107 is then scanned imagewise over the surface of coated dispersion 106' such that homogenized regions 108 and 108' are formed. The focused beam 107 supplies enough heat to raise the temperature of the dispersion 106 from temperature T1 to temperature T2, as shown on FIG. 2. At temperature T2 [or below if the melting point of component A is depressed in (L)A1B1] the solid component (S)A, of the composition (L)A1B1+(S)A, melts forming the composition (L)A1B1+(L)A. With all the components in the liquid state at temperature T2, rapid homogenization occurs creating a new composition (L)A2B2 at temperature T2. Upon cooling to below temperature EuA this composition (L) A2B2 solidifies to (S)A2B2 forming an object layer 108 and 108' surrounded by dispersion 106. In this example, the layer 108 and 108' would eventually cool to temperature T1.

Next the piston 102 is moved down the distance of one layer creating a cavity between the surface of dispersion 106' or the layer 108 and 108' and the platform surface 101'. New dispersion 105 is spread into this cavity creating an additional layer of coated dispersion 106. This layer of dispersion 106 is scanned imagewise with beam 107 such that all the components in the dispersion 106 are heated to temperature T2 causing melting and homogenization in the image regions 108 and 108'. The new image regions 108 and 108' are allowed to cool until new solid homogenized alloy regions (S)A2B2 108 and 108' are formed. These regions 108 and 108' preferably adhere to the previous alloy (S)A2B2 regions forming part of the integral objects 109 and 109'. The piston 102 is then lowered and all the coating and imagewise homogenization steps are repeated until complete integral objects 109 and 109' have been formed.

Upon completion of fabrication of integral objects 109 and 109', the piston 102 is raised. Dispersion 106, maintained at temperature T1, is allowed to flow away thereby separating the dispersion 106 from the integral objects 109 and 109'. If necessary, dispersion is removed from the object by washing, solvent, heating, or the like.

As an alternative to the above, only the doctor blade 104 and the dispersion 105 are heated to a temperature T1 while the remainder of the equipment shown in FIG. 1 is maintained at a temperature less than EuB. All the fabrication steps would be the same as described above, with the exception of the last step. In the last step, the piston 102 would be raised. The solidified block consisting of solidified coated dispersion 106 and integral objects 109 and 109' would be removed from the piston surface 102'. The solidified block would then be placed in an oven at temperature T1 where the dispersion 106 would be melted away from the integral objects 109 and 109'. As a further alternative, the piston 102 could be placed in the oven with the solidified block attached. The dispersion would then melt and flow away leaving the integral objects 109 and 109' which could be removed from the piston 102.

For some components A and B there may be a significant difference in density making the dispersion 106 unstable such that the liquid phase (L)A1B1 and the solid particles (S)A separate by gravity into separate layers. Such separation can be handled in different ways. One way would be to maintain the coated dispersion 106 at a temperature below EuB or solid so separation cannot occur or even if separation occurred it would happen layer by layer. The focused beam 107 could still be used to melt both the low melting component and the solid particle component to perform imagewise homogenization. Another way would be to use solid particles (S)A which are a higher melting alloy, an alloy of A and B (e.g. A1'B1' as shown in FIG. 2) than the liquid phase (L)A1B1 at temperature T1. The higher melting alloy would have a closer initial density with regard to the liquid phase density.

However, it is most preferred that the lower melting component(L)A1B1 be comprised of a significant amount of component A. This has two advantages, there is less of a density difference and less of component A need be present in order to enrich the alloy to a higher melting composition. Such a lower melting component (L)A1B1 would have a composition comprising component B in a % slightly more than intercomponent compound AB as shown in FIG. 2.

Figure 3:
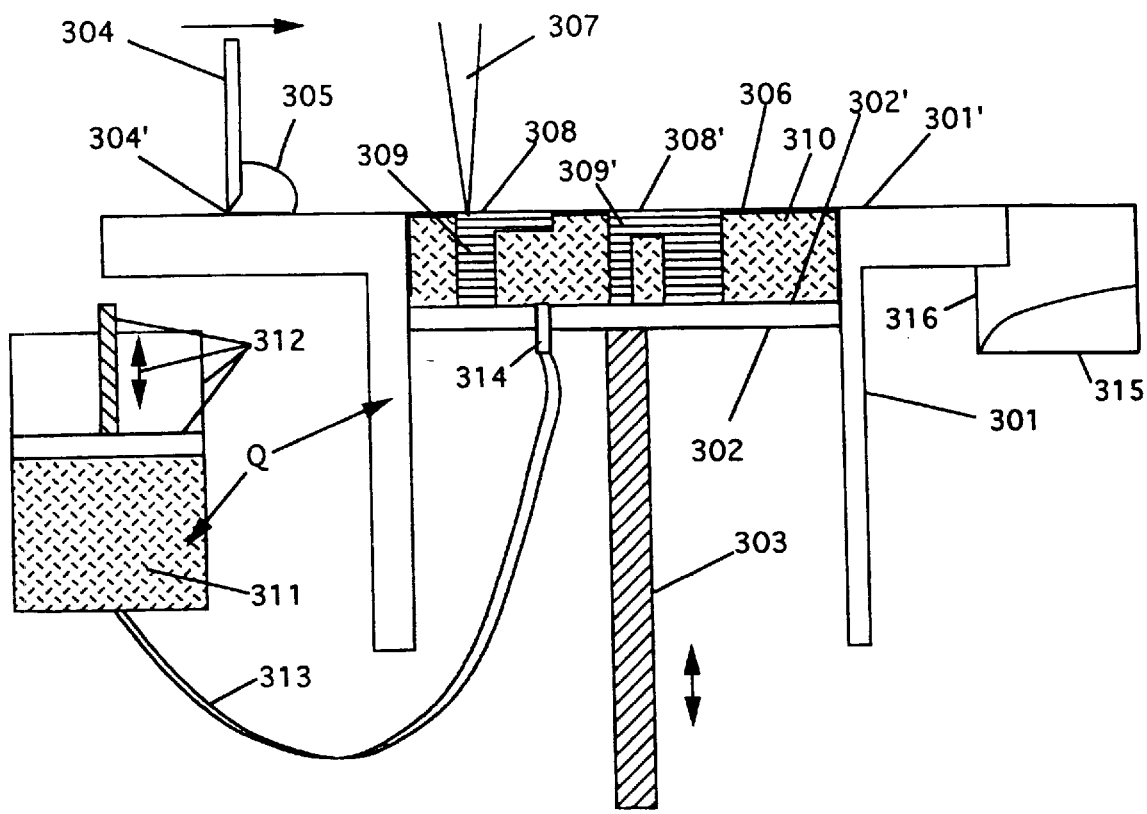
FIG. 3 is sectional view of alternative equipment suitable for carrying out the process of the invention.

Another method to carry out the process of the instant invention is shown in FIG. 3. The apparatus of FIG. 3 is very similar to that of FIG. 1. However, the operation is somewhat different. In this embodiment a solid powdered component 306 has a lower density than that of a liquid phase 310. Piston 302 is positioned within cylinder 301 such that a cavity is formed between piston surface 302' and coating platform surface 301'. The thickness of the cavity is less than the thickness of one layer. Solid powdered component 305 [(S)A in FIG. 2] is spread by doctor blade 304 with tip 304' slidably in contact with coating platform surface 301' such that the cavity is filled with spread solid powder component 306 [(S)A in FIG. 2]. Next the piston 302 is translated down by drive mechanism 303 the remaining thickness of the layer (i.e. the distance between the piston surface 302' and the platform surface 301' is one layer thickness). Pumping device 312 pumps liquid phase component 311 [(L)A1B1 in FIG. 2] through connector hose 313 and platform nozzle 314 into the cavity until the solid powder component 306 is substantially even with the top of the platform surface 301'. Heat Q is supplied to the apparatus and the pump 312 to maintain a temperature of T1 (as in FIG. 2). Since the solid powder component 306 has a lower density than the liquid phase component 310, the powder 306 floats at the surface but is preferably wetted by the liquid phase component 310. Focused beam 307 is scanned imagewise over the surface of the solid powder component 306 causing it to melt (the temperature is raised to T2 as in FIG. 2). The melted powder component 306 then rapidly homogenizes with the liquid phase component 310 in the image region and forms an alloy region 308 and 308' [(L)A2B2 in FIG. 2]. This alloy region 308 and 308' is allowed to cool to below temperature EuA in FIG. 2 and becomes solidified alloy region 308 and 308'. Pump mechanism 312 pumps liquid phase composition 311 into the cavity such that any remaining solid powder component 306 is raised above coating platform surface 301'. Doctor blade 304 is translated across the coating platform surface 301' and the solid powdered component 306 and some of the liquid phase component 310 are combined into a dispersion 315 which is pushed into container 316. Piston 302 is moved down less than the thickness of one layer. New solid powder component 305 is placed in front of doctor blade 304 where it is spread into the cavity made by the solidified alloy regions 308 and 308' and the surface of liquid phase component 310. Next the piston 302 is translated down the remaining distance of one layer. Pump mechanism 312 pumps more liquid phase component 311 into the cavity adding to liquid phase component 310 in the cavity. Enough liquid phase component 310 is pumped until the surface of the solid powder component 306 is substantially level with the surface of the coating platform 301'. Focused beam 307 is then scanned imagewise forming new homogenized alloy regions 308 and 308' which adhere to the previously formed image regions 308 and 308', where they overlap, thereby forming integral objects 309 and 309'. The steps of scraping off remaining dispersion 315, creating a cavity for coating new powder 306, creating a cavity for pumping in new liquid phase component 310, imagewise exposing with beam 307 to homogenize new regions 308 and 308' which adhere to integral object 309 and 309' are repeated until the integral objects 309 and 309' are completed. Finally, the integral objects 309 and 309' are separated from the powder 306 due to lack of inter-particle bonding, and from the liquid phase component 310 due to the difference in melting temperature.

As a further variation of the embodiment of FIG. 3, it is envisioned that the solid phase component 306 could be supplied in the form of a thin sheet which is melted imagewise by focused beam 307 to form homogenized alloy regions 308 and 308'. A new sheet 306 could be supplied for each layer. Such a method could be used independent of the density of the material components.

Still another embodiment involves the addition of a material component A in either solid or liquid form, in an imagewise fashion, to the surface of a liquid phase component (L)A1B1 contained in a vat or a piston/cylinder cavity. In the regions where the material component A is placed, homogenization would result forming an alloy (S)A2B2 having a higher melting temperature than the temperature of surrounding liquid phase component (L)A1B1. The homogenized regions would harden into layers which would be built into integral objects. The integral objects could then be separated from the surrounding liquid phase component (L)A1B1 since the objects would be solid at that temperature. The imagewise addition of material component could be accomplished using ink jet technology or powder jet technology.

In the practice of the invention the preferred property change for separation of imaged objects from non-imaged dispersion is a melting point change. The melting point change, assuming it is sufficiently large, allows a separation of the homogenized region from the unhomogenized region (unexposed to radiation) though the application of heat which causes the lower melting point region to melt away from the higher melting point region.

The layer-by-layer process as described herein allows the production of objects with property changes that exist deep within the object and with property changes of specific shape within the object. Returning to the example of the dispersion of bismuth and magnesium, it is possible to produce shaped object regions, which are homogenized such that the intermetallic compound $Mg_2Bi_2$ (melting point 823° C.) and dispersed Mg is the primary alloy, within an object which has greater homogenization such that an alloy having a temperature of 551° C. is formed. For example, the homogenization time or temperature could be lower for the intermetallic compound region, such that some magnesium powder is surrounded by the intermetallic compound.

In the practice of liquid phase sintering it is known that approximately 35% volume liquid is preferred, since this volume percent allows optimum rearrangement of the solid particles in the dispersion and therefore the greatest amount of densification. However, greater or lesser amounts of liquid may be present depending on the wetting characteristics of the particles with the liquid and the solubility characteristics of the components. In addition, since the process of the present invention involves a layer-by-layer processing of the dispersion or a surface liquid phase sintering process, rather than, for example, an impregnation of liquid into a compacted powder as in a bulk liquid phase sintering process, problems related to pore growth and such can be easily relieved through the surface during processing. Thus, the optimum liquid to solid ratios for surface liquid phase sintering are much broader than those ratios recommended for bulk liquid phase sintering. It is also important to note that a liquid phase need not be present just prior to the homogenization step when practicing the instant invention. Indeed it may be preferable to have the liquid phase present only during the coating steps, during the homogenization steps, and during the object separation steps when components A and B have a degree of solubility such that over a short period of time, premature homogenization occurs, since homogenization is usually greatly enhanced when at least one component is in the liquid state. Another method to prevent premature homogenization would be to use coated particles. The coating could be such that homogenization is only possible at elevated temperatures. An example coating would be an oxidized coated solid particle A. This oxide coating would be lost at the higher homogenization temperatures and could be reduced in an atmosphere of, for example, hydrogen. Or, the oxide coating could be incorporated as a third component into the homogenized alloy article.

Furthermore, the liquid phase need not be comprised of a pure component B or a pure component A. The liquid phase may be comprised of, for example, an alloy of component A and component B at a eutectic point such that upon heating above the eutectic isothermal line EuB temperature the liquid phase does not have crystalline components AB or β. Such a condition ensures a greater amount of liquid to solid particle ratio and also reduces the amount of homogenization required to change the composition to a higher melting alloy.

There are advantages when the solid particles are comprised of an alloy of components A and B at the eutectic point on the isothermal eutectic line EuA. With such an eutectic point alloy, the temperatures needed during the homogenization step or the amount of heat given during imagewise exposure can be lower since the alloy transitions directly to a liquid without containing some crystalline content of α or AB. However, use of an eutectic point alloy as the solid particle may require that more of the solid component be provided in the dispersion prior to homogenization since a certain amount of component A must be present in the imagewise homogenized region for a higher melting point alloy to be formed. A similar type situation occur, when starting with a lower melting alloy having a composition where the EuA line meets the a crystalline solidus curve and attempting to enrich this alloy with component A in order to form a higher melting alloy along the a solidus curve. Significant amounts of component A need to be homogenized into such an alloy. Such situations are less preferred since homogenization becomes more difficult.

For many material components and alloys, the atmosphere surrounding the process is critical. For example, some components may easily oxidize and require the use of vacuum conditions, inert gases, or reducing atmospheres in order to form the integral objects. Atmosphere can be controlled in the process or used in the alloy reaction. For example, oxygen can be used to form a ceramic alloy on the surface of a layer of liquid phase metal. Such a ceramic alloy or cermet (metal ceramic) typically has a much higher melting point than the surrounding pool of metal, allowing easy separation of an integral object. The metal component in this case could be supplied in sheet form and the oxygen could be supplied with, for example, an acetylene torch (with excess oxygen for some materials which are easily reduced with heat or with insufficient oxygen for materials which oxidize in the presence of carbon oxides) which is translated imagewise over the surface of each sheet stacked one on another. The heat from the torch would create a localized liquid phase component which would react with oxygen forming a higher melting alloy region. A new sheet would then be applied to the previous sheet and higher melting alloy region. The torch would then be translated imagewise over the surface of the new sheet forming a higher melting alloy region which would preferentially adhere to the previous alloy regions forming part of an integral object. This process would continue until all the layers of the integral object are formed. Then the sheets and the integral object would be placed in an oven (with a vacuum, inert or reducing atmosphere) such that the non-oxidized portions of the sheets are melted and allowed to flow away from the higher melting alloy integral object.

It is also possible to form regions of lower melting point by enriching a higher melting point layer with a component which, when homogenized with the higher melting point component, forms a lower melting point alloy. For example, a sheet of a higher melting point component A could be supplied. A second component B could be deposited imagewise on the surface of the sheet. The imagewise deposition of the second component could be a perimeter of the integral object to be formed or a region of greater area. The second component would be chosen such that, when the higher melting component and the second component are homogenized, a lower melting point alloy results. The second component would also be chosen such that the melting point of the sheet component would be depressed when in contact with the melted second component. The stacking of the sheets and the imagewise deposition of the second component would continue until all layers of the potential object have been applied. The stacked sheets (with the imagewise deposited second component) would then be placed in an oven at a temperature (above the depressed melting point temperature of the sheet but below the melting point of the sheet component) where the second component would melt and cause the stacked sheets to melt imagewise forming imagewise regions of relatively low melting alloy which would be drained away from the non-imaged stacked sheet regions. The non-imaged stacked sheet regions would then be heated to a temperature such the sheet layers sinter together and create an integral object. In a similar embodiment, the imagewise deposition step could be accompanied by an imagewise heat step such that a lower melting alloy results at each layer. If the temperature of the stacked sheets are above the melting point of the alloy, the alloy could be drained or removed by other means, such as by vacuum, at each layer.

Separation of the dispersion from the homogenized object can also be enhanced by using a suitable solvent. For example, the melting point of the dispersion could be lowered after the homogenized object has been formed by homogenizing the dispersion with additional low melting component or by the addition of another component capable of lowering the dispersion melting point.

Some homogenized regions and integral objects may be significantly soluble in the liquid phase component or even a solid phase component over a period of time. This condition would cause a loss of resolution in the object during manufacture since the object might dissolve in the liquid phase or the solid dispersion. In general, it is preferred that components are chosen such that the homogenized object is not significantly soluble in the dispersion of A and B. Problems in this regard can be avoided if the annealing temperature of the homogenized object is above the temperature required for separation of the homogenized object from the dispersion. For example, homogenized objects could be formed using nickel and copper as the components. Copper has a melting point of 1085° C. and nickel has a melting point of 1455° C. The melting point of homogenized alloys of copper and nickel would increase roughly linearly as a function of increasing nickel. However, typical annealing temperatures for copper-nickel alloys are below 870° C. indicating substantial solid solubility of copper with nickel. Therefore it is unlikely that a dispersion could be maintained or that the dispersion could be separated from the homogenized object, since the solubility of these components and alloys is high and the homogenized object would begin to lose resolution below the melting temperature of the low melting copper component.

Figure 4:
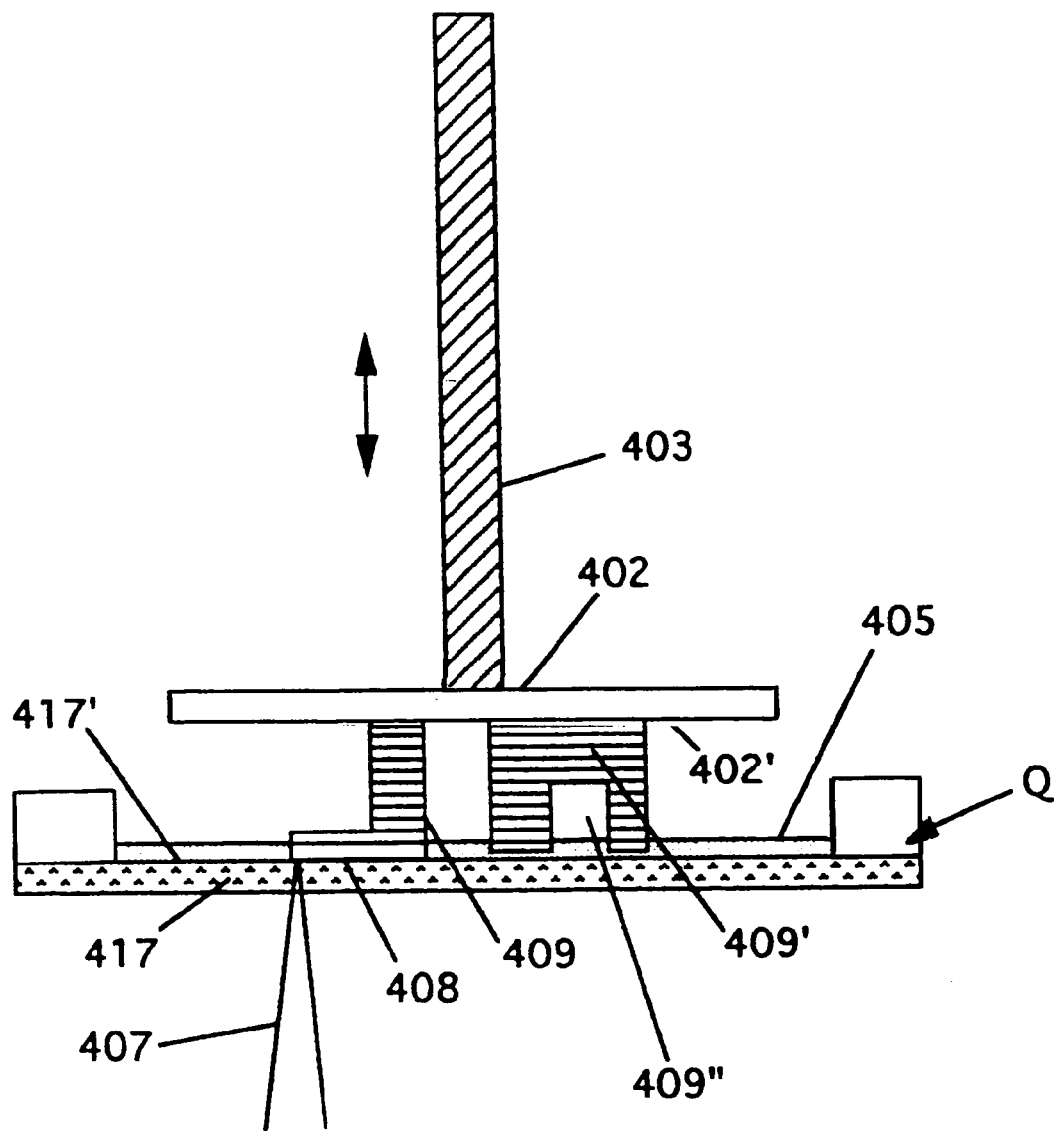
FIG. 4 is sectional view of still further alternative equipment suitable for carrying out the process of the invention.

FIG. 4 illustrates a process embodiment designed to minimize the length of time that the integral object is in contact with a liquid phase component. In the embodiment of FIG. 4 a platform 402, having a surface 402', is translated using a motorized drive 403 and positioned above and coplanar to a plate 417. The plate 417 may be made of, for example, fused silica glass such that focused beam 407 can be transmitted through it, or for example a high melting but conductive material, such as tungsten, which would absorb the energy from focused beam 407 and conduct the energy in the form of heat through a plate surface 417' to dispersion 405. Initially, platform 402 would be positioned in the liquid pool of dispersion 405 such that the platform surface 402' would be one layer thickness from the surface of plate 417'. Referring to FIG. 2, the temperature of dispersion 405 (and preferably substantial portions of the apparatus of FIG. 4 as provided by heat Q) is T1 and the composition is (L)A1B1+ (S)A. Referring back to FIG. 4, focused beam 407 is then scanned imagewise on regions 408 of the dispersion 405 in this layer raising the temperature [to T2 of FIG. 2] of these regions 408 and causing homogenization [and a new composition (L)A2B2 of FIG. 2] such that the melting point of the regions 408 is raised [to above the solidus lines of either a or EuA in FIG. 2] and upon cooling below the solidus, form solid regions 408 [having a composition (S)A2B2 in FIG. 2]. Preferably, the solid regions 408 adhere to platform surface 402' but do not substantially adhere to plate surface 417'. Next, platform 402 is raised at least the distance of one layer such that dispersion 405 forms a layer between solid region 408 and the surface of the plate 417'. Focused beam 407 is then scanned imagewise such that a new region 408 is homogenized and upon cooling preferentially adheres to the homogenized region 408 of the previous layer thereby forming a part of integral objects 409 and 409'. The steps of positioning the platform 402 such that a new layer of dispersion 405 is formed between homogenized solid region 408 and exposing with focused beam 407 imagewise such that new homogenized regions 408 are adhered to integral object 409 and 409' is continued until the objects 409 and 409' are complete. The level of dispersion 405 can be such that adequate dispersion 405 is supplied to form the object 409 and 409' but not enough to keep the object 409 and 409' submerged for long periods of time. In order to give further assurance of limited contact, when an object 409' (shown in cross section) has an enclosed volume 409" (a hollow region surrounded by part surfaces) such as shown with object 409', it may be necessary to raise the platform 402 to a distance greater than one layer in order to allow the enclosed volume 409" to drain of dispersion 405. Then the platform 402 can be lowered to form the new layer thickness.

Although separation of an integral object from a lower melting point region has been stressed, there are useful modes of carrying out the instant invention that do not require object separation. For example, a region of an object formed in a layer-by-layer process as described herein may be enriched, with greater amounts of the same or another component, such that it has different magnetic properties than the remainder of the object. For example, a gear could be formed with a region of different magnetic susceptibility which when rotated past a magnetic sensor would create an electrical pulse like an encoder. As a further example, a turbine could be formed with an internal region of a lower melting alloy or density which would provide an automatic balancing mechanism for the turbine at its operating temperature. As another example, regions could be included in integral objects which have different hardness, ductility, electrical/thermal conductivity, elasticity, color, etc., than the remainder of the object.

The foregoing disclosure will be illustrated by the following example, which is provided as illustration and not as limitation on the scope of the invention.

EXAMPLE 1

The following dispersion was prepared by mixing:

300 grams of crystalline 400,000 MW polyethylene oxide, 120 mesh 700 grams of trimethylolpropane triacrylate 11 grams of fine graphite lubricant powder The dispersion was mixed at room temperature to uniform consistency and moderate viscosity. Trimethylolpropane triacrylate is a liquid at room temperature and formed a liquid phase of the dispersion. Below approximately 43° C., the polyethylene oxide is essentially insoluble in the trimethylolpropane triacrylate. Above this temperature, sudden homogenization ensues with the homogenized region forming a rubbery solid having a higher melting point. The graphite was added to increase the surface absorption of the laser beam energy used (Argon Ion laser operating in the visible with all visible lines predominantly 488 and 514 nm). The graphite would not be necessary if laser wavelengths having greater surface absorbance were used or if other imagewise heating methods were employed.

The surface of the dispersion was scanned with the laser beam in a series of parallel lines spaced approximately 0.002 inches apart. The diameter of the beam spot was approximately 167 $\mu$m $1/e^2$ and the power was 2.89 watts. The photospeed of the dispersion was obtained by pouring a portion of the dispersion in a petri-dish and exposing the surface of the dispersion in one inch square regions. Shortly after exposure, and after the region was allowed to cool, the exposed surface was removed. The bottom surface of the layer was scraped off with a spatula and the layer thickness was then measured with calipers. By scanning the surface of the dispersion at various scan speeds the photospeed of the dispersion was found to be Ec 2644 mJ/cm$^2$ and Dp 21.7 mils. Scanning of the focused beam was achieved utilizing an X-Y mirror set which deflected the focus of the beam across the surface of the dispersion in an imagewise manner utilizing the scanning technology disclosed in U.S. Pat. No. 5,014,207. Although it is preferred to modulate the beam at the end of vectors and while drawing the vector lines, in order to provide uniform exposure, the beam was not modulated while carrying out the steps in Example I.

While approximately 7 parts of trimethylolpropane triacrylate to 3 parts of polyethylene oxide were used for making the object in Example 1, greater amounts of polyethylene oxide in a composition can be used to make objects which retain some crystallinity, and lower amounts of polyethylene oxide may be used to form objects which are more rubbery (more plasticized by the un-alloyed triacrylate). Furthermore, other acrylates or diluents and other solid polymers are useful in the practice of the instant invention so long as the diluent and the solid polymer form an alloy having a higher melting temperature than at least the melting point of the diluent allowing easy separation of the alloy object from the diluent dispersion.

Other objects, made simply by heat homogenizing 2 parts trimethylolpropane triacrylate and 1 part polyethylene oxide, were essentially insoluble in trimethylolpropane triacrylate or isopropyl alcohol and therefore these materials are suitable cleaning solvents when separating the homogenized objects from the dispersion. However, water tended to swell and soften a homogenized object made from this dispersion.

The parts 109 and 109' had cantilevered sections and other unsupported sections as depicted in FIG. 1. The size of the parts were as large as 2 inches (50 mm) square and 0.64 inches (16.3 mm) high. However, there was no identifiable limitation of size other than that of the capacity of the equipment used and the fineness of the dispersion 106. The dispersion 106 was capable of producing unsupported, cantilevered and bridging, regions in parts 109 and 109' as large as 0.4 inches (10 mm). The parts 109 and 109' were cleaned in isopropyl alcohol.

The parts produced in this example can be used in an investment casting process where the parts are used as a pattern and dipped in a ceramic slurry. The pattern with the ceramic slurry shell can then be fired, burning off the pattern and hardening the ceramic shell. In order to prevent the water in the slurry from swelling the pattern, the pattern could first be dipped in a free radical initiator bath, for example a peroxide, which would tend to cross-link the trimethylolpropane triacrylate at the surface of the part. Alternatively, the pattern could be dipped in a free-radical photoinitiator liquid such as Irgacure (1173, 2-Hydroxy-2-methyl-2-phenyl-propan-1-one; Ciba Corporation, Hawthorne N.Y.), or any liquefied free-radical photointiator, and then exposed to UV light in order to cross-link the outer portions of the pattern. Alternatively the pattern could be coated with, for example, a wax or a paint. During the firing process of a shell and pattern for investment casting, it is a known problem that the pattern may have a greater thermal coefficient of expansion than that of the ceramic shell. Under such conditions, the pattern may expand to such a degree that it cracks the shell before the pattern burns-off during firing. In the case of the example dispersion, the trimethylolpropane triacrylate will polymerize during the firing step and therefore the pattern will shrink. In fact, homogenized objects, made from the dispersion, were exposed to hot air from a hot air gun. The objects heated in this manner did not melt but became very stiff and then eventually charred. Alternatively, incorporation of a free-radical photointiator which is also thermally degradable, or a thermally degradable free-radical initiator, such as for example a Vazo® (Cyclohexanecarbonitrile, 1,1'-azobis, available from DuPont, Wilmington, Del.) in the formulation would further ensure shrinkage, due to acrylate free-radical polymerization of the pattern during firing. In such a case for investment casting patterns, it is preferred that the photoinitiator not form significant quantities of free-radicals due to exposure by beam 107, such as would occur when a dispersion containing a UV photoinitiator is exposed by visible or infra-red light, or that the temperature reached during the fabrication of the object 109 not be high enough to cause the thermally degradable free-radical initiator to form significant quantities of free-radicals such that the acrylate is polymerized during object formation. For other object uses, some polymerization of the acrylate as well of homogenization of the dispersion may be advantageous and preferred.

The exposures necessary to produce a layer for the dispersion in Example I were somewhat higher than normally required. Light absorbers such as graphite are often not as efficient as certain thermal dyes which can be mixed on a molecular level, which have a greater yield for conversion of photon energy to phonon energy, and which may not have a large emittance. Although graphite and some other dyes have a fairly high and somewhat uniform absorption over the UV to near infrared spectrum, it should be appreciated that often other dyes have significantly greater absorption over a narrower wavelength region and are therefore optimally associated with lasers having an emission wavelength within the absorption wavelength of the dye. Examples of other thermal dyes are listed in U.S. Pat. No. 5,193,024, with the squalarium dye SQS being preferred. Synthesis of SQS is disclosed in Kawamura (U.S. Pat. No. 4,283,475) and Gravesteijn (U.S. Pat. No. 4,508, 811). SQS is best used with a diode laser emitting at a wavelength of approximately 830 nm. It should also be appreciated that in some cases the dispersion itself may have a significant absorption at the emission wavelength of some lasers. In such a case, it may not be necessary to add any other absorber in order to induce localized heat and subsequent homogenization of the dispersion in an imagewise manner. Furthermore, it should be appreciated that imagewise heat can be provided from other sources, such as for example an acetylene torch which, if fitted with a small tip, can produce a flame of resolution in the range of mils, for example "The Little Torch", manufactured by Smith Equipment, Waterton, S.D. Such a flame tip can be translated over the surface of the dispersion in an imagewise fashion by, for example, the adaptation of an X-Y pen plotter such that the flame tip replaces the pen. Or, if the dispersion and the homogenized region are electrically conductive and are adapted to form a ground plane, localized heat could be provided through the use of a translated carbon electrode, of opposite polarity to the ground plane, adapted to replace the pen in an X-Y pen plotter. The degree of homogenization may be controlled by, for example, homogenization temperature or homogenization time. The imagewise homogenization may also be aided through the use of localized ultrasonic energy, for example a modulated laser beam as taught in U.S. Pat. No. 4,330,699 by Farrow.

Other embodiments will be apparent to those skilled in the art from the foregoing description.

What is claimed is:

1. A process for producing a homogenized, three-dimensional, integral object by imagewise thermal radiation of a dispersion, the dispersion containing components A and B, comprising the steps of:

a) providing the dispersion containing components A and B;

b) forming the dispersion into a layer;

c) homogenizing the dispersion by applying imagewise thermal radiation to form an alloy of components A and B; and d) repeating steps a)–c) by applying each successive layer of the dispersion onto the previous layer of the dispersion, such that each new homogenized region becomes integral with the previous homogenized region to form the homogenized, three-dimensional, integral object.

2. The process as claimed in claim 1, further comprising separating the integral object from non-imaged areas of the dispersion.

3. The process as claimed in claim 1, wherein the alloy comprising the integral object has a different melting point than the dispersion of components A and B.

4. The process as claimed in claim 1, wherein components A and B are polymers, metals or ceramics.

5. The process as claimed in claim 1, wherein components A and B are polymers and the alloy formed by imagewise radiation is a polymer alloy.

6. The process as claimed in claim 5, wherein one of the polymer components is liquid and one of the polymer components is particulate.

7. The process as claimed in claim 1, wherein components A and B are metals and the alloy formed by imagewise radiation is a metal alloy.

8. The process as claimed in claim 1, wherein the alloy is a metal ceramic.

9. The process as claimed in claim 1, wherein component A is a solid and component B is a liquid.

10. The process as claimed in claim 9, wherein component A is particulate.

11. The process as claimed in claim 9, wherein component A is crystalline.

12. The process as claimed in claim 9, wherein component A is in sheet form or powder form.

13. The process as claimed in claim 9, wherein component A and component B differ in density, and the temperature of the dispersion is maintained so as to retard or prevent separation of the components.

14. The process of claim 9, wherein component A and component B differ in density, and the dispersion of components A and B comprises a solid phase alloy of A and B dispersed in liquid component B.

15. The process as claimed in claim 1, wherein the dispersion further comprises a thermal dye.

16. The process as claimed in claim 1, wherein component A has a melting point MpA, component B has a melting point MpB, and MpA is higher than MpB, and wherein homogenization forms an alloy having an eutectic which is different from MpB.

17. The process of claim 16, wherein the integral article is separated from the dispersion based on difference in melting point.

18. The process as claimed in claim 5, wherein the polymer alloy of component A/component B is polycaprolactone/poly(vinylchloride), polycaprolactone/Saran, polycaprolactone/bisphenol A polycarbonate, poly(vinyl methyl ether)/phenoxy, poly(ethylene oxide)/phenoxy, poly(ethylene oxide)/poly(acrylic acid), BPA polycarbonate/PHFA, or polystyrene/polyphenylene oxide.

19. The process as claimed in claim 7, wherein components A and B comprise bismuth and magnesium or aluminum and gallium.

20. A process for producing a homogenized, three-dimensional, integral object of components A and B, comprising the steps of:

a) providing a layer of liquid component B;

b) homogenizing components A and B by adding solid or liquid component A in an imagewise manner to a surface of the layer of liquid component B for forming an alloy layer of components A and B, which alloy layer hardens upon homogenization;

c) repeating steps a)–b) by applying each successive alloy layer of homogenized region onto the previous alloy layer, such that each new homogenized region becomes integral with the previous homogenized region to form the homogenized, three-dimensional, integral object.

21. The process as claimed in claim 20, wherein the imagewise addition of components is carried out by ink or powder jetting one component onto the previous layer.

* * * * *

UNITED STATES PATENT AND TRADEMARK OFFICE
CERTIFICATE OF CORRECTION

PATENT NO. : 5,980,812
DATED : Nov. 9, 1999
INVENTOR(S) : John A. Lawton

It is certified that error appears in the above-identified patent and that said Letters Patent is hereby corrected as shown below:

On the title page,

Item [76], change the inventor's hometown from "Landenburg" to

-- Landenberg --;

Item [56], add the following U.S. PATENT DOCUMENTS:

-- 4,944,817    7/1990    Bourell et al.

5,076,869    12/1991    Bourell et al.

5,147,587    9/1992    Marcus et al.

5,156,697    10/1992    Bourell et al.

5,182,170    1/1993    Marcus et al. --;

Item [56], first column, second reference of OTHER PUBLICATIONS, change the phrase "War in an imagewise manner rendale, Pa." to -- Warrendale, PA --; and

UNITED STATES PATENT AND TRADEMARK OFFICE
CERTIFICATE OF CORRECTION

PATENT NO. : 5,980,812
DATED : Nov. 9, 1999
INVENTOR(S) : John A. Lawton

It is certified that error appears in the above-identified patent and that said Letters Patent is hereby corrected as shown below:

Item [56], second column, second line of eighth reference from the top (B.H. Birmingham and H.L. Marcus) change the phrase ". . . Silicon Garbide" to -- . . . Silicon Carbide --.

Column 4, line 37, change the word "Batelle" to -- Battelle --;

Column 5, line 17, change the phrase "crystalline structure a" to -- crystalline structure $\alpha$ --;

Column 5, line 45, change the phrase "a and $\beta$" to -- $\alpha$ and $\beta$ --;

Column 6, line 39, change the word "liquids" to -- liquidus --;

Column 11, line 57, change the word "occur" to -- occurs --;

Column 11, lines 58-59, change the phrase "a crystalline solidus curve" to -- $\alpha$ crystalline solidus curve --; and Column 11, line 61, change the phrase "a solidus curve" to -- $\alpha$ solidus curve --.

UNITED STATES PATENT AND TRADEMARK OFFICE
CERTIFICATE OF CORRECTION

PATENT NO. : 5,980,812
DATED : Nov. 9, 1999
INVENTOR(S) : John A. Lawton

It is certified that error appears in the above-identified patent and that said Letters Patent is hereby corrected as shown below:

In the Claims:

Claim 5, lines 2-3 (column 17, lines 20-21), insert the word -- thermal -- between the words "imagewise" and "radiation";

Claim 7, lines 2-3 (column 17, lines 26-27), insert the word -- thermal -- between the words "imagewise" and "radiation";

Claim 17, lines 2-3 (column 18, lines 12-13), change the phrase "difference in melting point" to -- different melting points --; and Claim 19, line 2 (column 18, line 22), change the word "comprise" to -- are --.

The following claims should be added:

22. The process as claimed in claim 1, wherein the process is carried out in an inert atmosphere, a reducing atmosphere, an oxidizing atmosphere, or under a vacuum.

UNITED STATES PATENT AND TRADEMARK OFFICE
CERTIFICATE OF CORRECTION

PATENT NO. : 5,980,812
DATED : November 9, 1999
INVENTOR(S) : John A. Lawton

Page 4 of 4

It is certified that error appears in the above-identified patent and that said Letters Patent is hereby corrected as shown below:

23. The process as claimed in claim 1, wherein one of the components A and B is in an above solidus state in the layer of the dispersion of step b).

24. The process as claimed in claim 1, where one component of the alloy is a polymer and the other component of the alloy is a polymer or a metal.

Signed and Sealed this

Twelfth Day of December, 2000

*Attest:*

Q. TODD DICKINSON

*Attesting Officer*     *Director of Patents and Trademarks*